United States Patent
Kaliski, Jr.

(10) Patent No.: US 9,900,281 B2
(45) Date of Patent: Feb. 20, 2018

(54) COMPUTER-IMPLEMENTED METHOD, APPARATUS, AND COMPUTER-READABLE MEDIUM FOR PROCESSING NAMED ENTITY QUERIES USING A CACHED FUNCTIONALITY IN A DOMAIN NAME SYSTEM

(71) Applicant: VERISIGN, INC., Reston, VA (US)

(72) Inventor: Burton S. Kaliski, Jr., McLean, VA (US)

(73) Assignee: VERISIGN, INC., Reston, VA (US)

( * ) Notice: Subject to any disclaimer, the term of this patent is extended or adjusted under 35 U.S.C. 154(b) by 52 days.

(21) Appl. No.: 14/252,483

(22) Filed: Apr. 14, 2014

(65) Prior Publication Data

US 2015/0295882 A1    Oct. 15, 2015

(51) Int. Cl.
*G06F 15/16* (2006.01)
*H04L 29/12* (2006.01)
(Continued)

(52) U.S. Cl.
CPC ........ *H04L 61/106* (2013.01); *H04L 61/1511* (2013.01); *H04L 61/1552* (2013.01);
(Continued)

(58) Field of Classification Search
CPC .............. H04L 61/106; H04L 61/1511; H04L 61/1552; H04L 67/18; H04L 67/2842; H04L 63/08
(Continued)

(56) References Cited

U.S. PATENT DOCUMENTS

| | | |
|---|---|---|
| 5,721,827 A | 2/1998 | Logan et al. |
| 6,119,143 A | 9/2000 | Dias et al. |

(Continued)

FOREIGN PATENT DOCUMENTS

| | | |
|---|---|---|
| JP | 2005086700 A | 3/2005 |
| WO | 2000014938 | 3/2000 |

(Continued)

OTHER PUBLICATIONS

Non-Final Office Action dated Nov. 14, 2014, U.S. Appl. No. 13/839,554, filed Mar. 15, 2013, pp. 1-193.
(Continued)

*Primary Examiner* — Thuong Nguyen
(74) *Attorney, Agent, or Firm* — MH2 Technology Law Group, LLP

(57) ABSTRACT

The present disclosure relates to a computer-implemented method for responding to a query request from a requestor using information supplied by an authoritative name server. The computer-implemented method can include obtaining, by a DNS resolution server, a query for a named resource from a requestor, wherein the query comprises information comprising contextual information related to the requestor. The method can obtain at least a portion of a zone file of a domain name space using the domain name system (DNS), one or more rules, and information on how to access information that is not local to the DNS resolution server from the authoritative name server based on the query obtained from the requestor. An answer can then be provided to the query from requester based on the at least a portion of the zone file, the one or more rules, and the contextual information.

22 Claims, 6 Drawing Sheets

(51) Int. Cl.
  *H04L 29/06* (2006.01)
  *H04L 29/08* (2006.01)
(52) U.S. Cl.
  CPC .............. *H04L 63/08* (2013.01); *H04L 67/18* (2013.01); *H04L 67/2842* (2013.01)
(58) Field of Classification Search
  USPC .................. 709/217, 203, 223, 245; 370/338
  See application file for complete search history.

(56) References Cited

U.S. PATENT DOCUMENTS

| | | | |
|---|---|---|---|
| 6,154,777 A | 11/2000 | Ebrahim | |
| 6,560,634 B1 | 5/2003 | Broadhurst | |
| 6,684,250 B2 | 1/2004 | Anderson et al. | |
| 6,728,767 B1 | 4/2004 | Day et al. | |
| 6,769,028 B1 | 7/2004 | Sass et al. | |
| 6,839,421 B2 | 1/2005 | Esparza et al. | |
| 7,152,118 B2 | 12/2006 | Anderston, IV et al. | |
| 7,299,491 B2 | 11/2007 | Shelest et al. | |
| 7,367,046 B1 | 4/2008 | Sukiman et al. | |
| 7,533,266 B2 | 5/2009 | Bruekers et al. | |
| 7,542,468 B1 | 6/2009 | Begley et al. | |
| 7,720,057 B2 | 5/2010 | Igarashi | |
| 7,725,536 B2* | 5/2010 | Douglis | H04L 29/12066 709/203 |
| 7,796,978 B2 | 9/2010 | Jones et al. | |
| 7,864,709 B2 | 1/2011 | Cheshire | |
| 7,895,319 B2 | 3/2011 | Statia et al. | |
| 7,917,616 B2 | 3/2011 | Trace et al. | |
| 7,984,149 B1* | 7/2011 | Grayson | 709/226 |
| 7,991,910 B2 | 8/2011 | Richardson et al. | |
| 8,468,351 B2 | 6/2013 | Boesgaard Sorensen | |
| 8,489,637 B2 | 7/2013 | Patil | |
| 8,521,908 B2 | 8/2013 | Holmes et al. | |
| 2001/0042109 A1 | 11/2001 | Bolas et al. | |
| 2002/0073335 A1 | 6/2002 | Shuster | |
| 2002/0099952 A1* | 7/2002 | Lambert | G06F 21/51 726/27 |
| 2003/0009591 A1 | 1/2003 | Hayball et al. | |
| 2003/0182447 A1 | 9/2003 | Schilling | |
| 2003/0195984 A1 | 10/2003 | Zisapel et al. | |
| 2004/0039798 A1* | 2/2004 | Hotz | H04L 61/1511 709/219 |
| 2004/0128514 A1 | 7/2004 | Rhoads | |
| 2004/0210672 A1* | 10/2004 | Pulleyn | H04L 29/12066 709/245 |
| 2005/0044352 A1 | 2/2005 | Pazi et al. | |
| 2005/0111384 A1 | 5/2005 | Ishihara et al. | |
| 2005/0213572 A1 | 9/2005 | Huang et al. | |
| 2006/0192994 A1* | 8/2006 | Tanimoto | H04L 29/12066 358/1.15 |
| 2006/0242321 A1 | 10/2006 | Hedge et al. | |
| 2007/0124487 A1 | 5/2007 | Yoshimoto et al. | |
| 2007/0204341 A1 | 8/2007 | Rand et al. | |
| 2008/0052758 A1* | 2/2008 | Byrnes | H04L 63/0263 726/1 |
| 2008/0077695 A1 | 3/2008 | Schmidt | |
| 2008/0189774 A1 | 8/2008 | Ansari et al. | |
| 2008/0222306 A1 | 9/2008 | Bhakta et al. | |
| 2009/0055929 A1 | 2/2009 | Lee et al. | |
| 2009/0158318 A1 | 6/2009 | Levy | |
| 2009/0172192 A1 | 7/2009 | Christian et al. | |
| 2009/0182884 A1 | 7/2009 | Datta et al. | |
| 2010/0005146 A1* | 1/2010 | Drako | G06Q 10/00 709/206 |
| 2010/0023611 A1 | 1/2010 | Yang et al. | |
| 2010/0037314 A1 | 2/2010 | Perdisci et al. | |
| 2010/0049872 A1 | 2/2010 | Roskind | |
| 2010/0057936 A1 | 3/2010 | Roskind | |
| 2010/0064047 A1 | 3/2010 | Sullivan | |
| 2010/0077462 A1 | 3/2010 | Joffe et al. | |
| 2010/0223364 A1 | 9/2010 | Wei | |
| 2010/0228819 A1 | 9/2010 | Wei | |
| 2010/0274970 A1 | 10/2010 | Treuhaft et al. | |
| 2010/0284411 A1 | 11/2010 | Mirani et al. | |
| 2011/0035469 A1 | 2/2011 | Smith et al. | |
| 2011/0075675 A1 | 3/2011 | Koodli et al. | |
| 2011/0078292 A1 | 3/2011 | Ananda et al. | |
| 2011/0137973 A1 | 6/2011 | Wei et al. | |
| 2011/0153831 A1 | 6/2011 | Mutnuru et al. | |
| 2011/0238192 A1 | 9/2011 | Shah | |
| 2012/0117621 A1* | 5/2012 | Kondamuru | H04L 29/12066 726/3 |
| 2012/0143982 A1 | 6/2012 | Oster et al. | |
| 2012/0147834 A1 | 6/2012 | Zisimopoulos et al. | |
| 2012/0173684 A1* | 7/2012 | Courtney | H04L 29/12066 709/222 |
| 2012/0185914 A1* | 7/2012 | Delco | G06F 9/45558 726/1 |
| 2012/0191874 A1* | 7/2012 | Robinson | H04L 29/12066 709/245 |
| 2012/0303804 A1 | 11/2012 | Sundaram et al. | |
| 2012/0321052 A1 | 12/2012 | Morrill et al. | |
| 2013/0018944 A1* | 1/2013 | Shyamsunder | G06F 17/30876 709/203 |
| 2013/0019311 A1 | 1/2013 | Swildens et al. | |
| 2013/0198065 A1 | 8/2013 | McPherson et al. | |
| 2014/0036897 A1* | 2/2014 | Frydman | H04W 40/00 370/338 |
| 2014/0068043 A1* | 3/2014 | Archbold | H04L 61/1511 709/223 |
| 2014/0149601 A1* | 5/2014 | Carney | H04L 67/1097 709/238 |
| 2014/0207835 A1* | 7/2014 | Jellick | H04L 41/082 707/827 |
| 2014/0280963 A1* | 9/2014 | Burbridge | H04L 61/1511 709/226 |
| 2014/0282847 A1* | 9/2014 | Blacka | H04L 61/1511 726/1 |
| 2015/0074221 A1* | 3/2015 | Kuparinen | H04L 29/12066 709/214 |
| 2015/0295882 A1* | 10/2015 | Kaliski, Jr. | H04L 61/106 709/217 |

FOREIGN PATENT DOCUMENTS

| | | |
|---|---|---|
| WO | 2006114133 A1 | 11/2006 |
| WO | 2012062382 A1 | 5/2012 |

OTHER PUBLICATIONS

Notice of Allowance and Fees Due dated Jan. 30, 2015, U.S. Appl. No. 13/828,070, filed Mar. 14, 2013, pp. 1-17.
Final Office Action dated Apr. 6, 2015, U.S. Appl. No. 13/839,554, filed Mar. 15, 2013, pp. 1-198.
Author Unknown, "What does a DNS request look like?", Server Fault, http://serverfault.com/questions/173187/what-does-a-dns-request-look-like, Aug. 22, 2010, pp. 1-4.
C. Contavalli, "Client IP Information in DNS Requests", IETF, http://tools.ietf.org/pdf/draft-vandergaast-edns-client-ip-01.pdf, May 21, 2010, pp. 1-23.
Extended European Search Report dated Jun. 4, 2014, issued in European Application No. 14160024.7 filed Mar. 14, 2014, pp. 1-11.
Final Office Action dated Jun. 13, 2014, U.S. Appl. No. 13/839,554, filed Mar. 15, 2013, pp. 1-23.
Final Office Action dated Mar. 7, 2014, U.S. Appl. No. 13/839,554, filed Mar. 15, 2013, pp. 1-24.
Non-Final Office Action dated Sep. 23, 2013, U.S. Appl. No. 13/839,554, filed Mar. 15, 2013, pp. 1-20.
Ballani et al., "Towards a global IP Anycast service", http://research.microsoft.com/en-us/um/people/hiballan/talks/talk-sigcomm05-pias.pdf, accessed Mar. 14, 2013, pp. 1-59.
M. Tariq Banday, "Recent Developments in the Domain Name System", International Journal of Computer Applications (0975-8887), vol. 31, No. 2, Oct. 2011, pp. 18-25.
Extended European Search Report dated Aug. 27, 2015, European Application No. 15163265.0, pp. 1-4.

(56) References Cited

OTHER PUBLICATIONS

Non-Final Office Action dated Sep. 3, 2013, U.S. Appl. No. 13/836,682, filed Mar. 15, 2013, pp. 1-44.
Jeff Tyson, "How Encryption Works", Dec. 6, 2005, howstuffworks.com, retrieved from Wayback Machine http://web.archive.org/web/20051206043803/http://computer.howstuffworks.com/encryption/htm/printable, pp. 1-4.
Basu et al., "Persistent Delivery With Deferred Binding to Descriptively Named Destinations", MILCOM 2008—2008 IEEE Military Communications Conference, 8 pp.
European Search Report dated Jan. 22, 2013, European Application No. EP 12187127, filed Oct. 3, 2012, pp. 1-5.
Eastlake, Donald, "Domain Name System Security Extensions; draft-ietf-dnsseo-secext2-07.txt." Dec. 1, 1988, vol. dnssec, No. 7, Dec. 1, 1998, 88 pages.
Teddy Mantoro et al. An Implementation of Domain Name System Security Extensions Framework for the Support of IPv6 Environment, 2011 International Conference on Multimedia Computing and Systems (ICMCS), Apr. 7-9, 2011, pp. 1-6.
Kiril Lashchiver, Domain Name System Anomaly Detection and Prevention, Thesis of School Engineering and Computer Science, The Hebrew University of Jerusalem; Jerusalem, Israel, Sep. 2010, pp. 1-57.
Chandramouli et al., "Challenges in Securing the Domain Name System," www.computer.org/security/, The IEEE Computer Society, Jan./Feb. 2006, pp. 84-87.
But et al., "Evaluting the Impact of DNS and HTTP Session Characteristics on Consumer ISP Web Traffic," TenCon2005, http://caia.swin.edu.au, Nov. 2005, pp. 1-11.
Karygiannis, Tom et al. Challenges in Securing the Domain Name System. Emerging Standards, Jan./Feb. 2006, pp. 84-87.
Joao Raposo Pires (Examiner), Communication Pursuant to Article 94(3) EPC dated Sep. 15, 2017, European Application No. 12187127.1, pp. 1-5.

* cited by examiner

Traffic management script 300
for "example.com"

Start: IF GEO of requestor = East of the Mississippi River THEN
    GOTO Load_Balance;
ELSE
    GOTO Fail_Over_212;

Load_Balance: IF Random Number <= 80 THEN
    GOTO Fail_Over_1;
ELSE
    GOTO Fail_Over_2;

Fail_Over_1: IF East Coast Server No. 1 = Up THEN
    IP_Address = 192.0.2.1; END.
ELSE
    GOTO Fail_Over_2;

Fail_Over_2: IF East Coast Server No. 2 = Up THEN
    IP_Address = 192.0.2.2; END.
ELSE
    GOTO Fail_Over_212;

Fail_Over_212: IF West Coast Server = Up THEN
    IP_Address = 203.0.113.1; END.
ELSE
    GOTO Fail_Over_213;

Fail_Over_213: IF East Coast Server No. 1 = Up THEN
    IP_Address = 192.0.2.1; END.
ELSE
    IP_Address = 192.0.2.2; END.

FIG. 3A

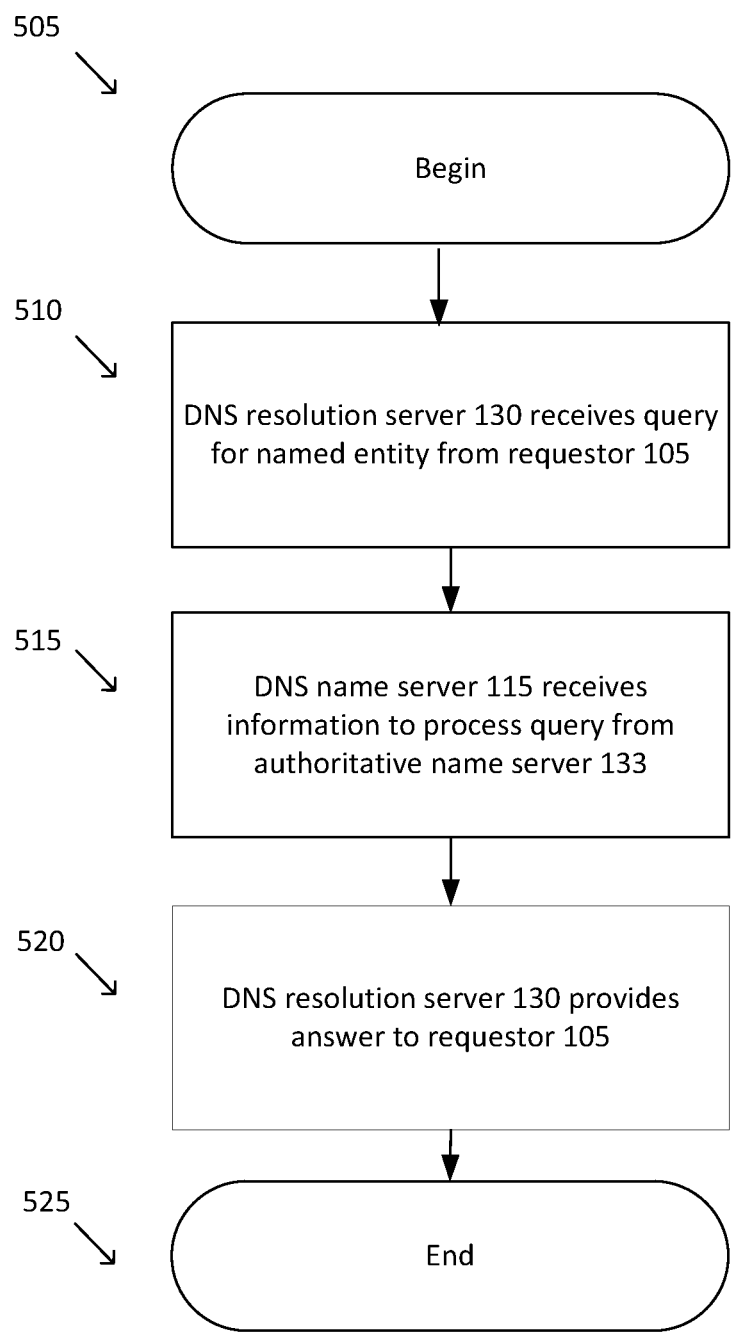

COMPUTER-IMPLEMENTED METHOD, APPARATUS, AND COMPUTER-READABLE MEDIUM FOR PROCESSING NAMED ENTITY QUERIES USING A CACHED FUNCTIONALITY IN A DOMAIN NAME SYSTEM

CROSS REFERENCE TO RELATED APPLICATIONS

This application is related to U.S. patent application Ser. No. 13/828,070, titled "Adaptive Name Resolution," filed on Mar. 14, 2013, to Danny McPherson et al. and U.S. patent application Ser. No. 13/839,554, titled "High Performance DNS Traffic Management," filed on Mar. 15, 2013, to Stephen D. James et al., hereby incorporated by reference in their entirety.

TECHNICAL FIELD

This disclosure generally relates to Domain Name System (DNS) resolution. In particular, this disclosure relates to methods and systems providing responses to DNS resolution requests using a functional cache.

BACKGROUND

The domain name system (DNS) utilizes a hierarchical structure to associate fully qualified domain names to a particular internet protocol (IP) address in response to a DNS query. For example, if a user visits the website www.example.com on their computer's Internet browser, typically, the stub resolver on the computer would (1) first check its own DNS cache for a suitable response; (2) if not available in the cache, query a recursive name server or possibly additional levels of the delegation graph from the root DNS server downward with the same information, expecting a reply. If the queried system has the information or is authoritative for the precise question, it provides a response or error. If it does not, but knows who does, it provides a delegation/referral to a server that should have more precise information. To leverage larger caching mechanisms, a DNS resolver recursive name server may be used between steps (1) and (2). Because a DNS resolver services many users, it typically holds a larger cache, helping to reduce the load on root servers and registry servers and often minimize response times for users because it is commonly topologically closer to the client. A DNS resolver may also act as a recursive name server, handling the multiple transactions and following delegations/referral chains between different name servers to resolve the final IP address for the resource in question, simply passing the final answer back to the user's computer. A DNS resolver may ultimately provide in its response a network layer identifier or service location id, which in some instances may be the same.

It is therefore desirable to have a solution that maintains some level of cache at an intermediate name server, while recognizing that the response may depend on the context in an adaptive approach.

SUMMARY

In accordance with implementations consistent with the present teachings, a computer-implemented method for responding to a query request from a requestor using information supplied by an authoritative name server is disclosed. The computer-implemented method can include obtaining, by a DNS resolution server, a query for a named resource from a requestor, wherein the query comprises information comprising a contextual information related to the requestor; obtaining at least a portion of a zone file of a domain name space using the domain name system (DNS), one or more rules, and information on how to access information that is not local to the DNS resolution server from the authoritative name server based on the query obtained from the requestor; and providing, to the requestor, an answer to the query based on the at least a portion of the zone file, the one or more rules, and the contextual information.

In implementations, the computer-implemented method can include caching the one or more rules, and the information on how to access information that is not local to the DNS resolution server from the authoritative name server based on the query obtained from the requestor.

In implementations, the computer-implemented method can include determining that the at least the portion of the zone file is not current; and providing a request to the authoritative name server for an update to the at least the portion of the zone file; and providing the answer using the at least the portion of the zone file that was updated.

In implementations, providing the request to the authoritative name server can further include providing authentication information to the authoritative name server to authenticate the DNS resolution server.

In implementations, the requestor can include a client computer, a user associated with the client computer, and/or an agent acting on behalf of the client computer or the user.

In implementations, the contextual information can be related to the requestor and/or an identifier included in the query. For example, the information related to the requestor can include, but is not limited to, spatial, e.g., the location of the requestor, temporal, e.g., the time of day or week that the request is being made, security level or access permission level of the requestor, or combinations thereof. The information related to the operating environment of the requestor's device can include, but is not limited to, type of device, hardware configuration, software configuration, platform-type of the device, wireless connectivity information, e.g., strength of wireless signal, spatial, e.g., location of the requestor, and combinations thereof. Responses to the request can be dependent and/or customized based on the information related to the requestor and/or the requestor's device operating environment.

In implementations, the DNS resolution server can be operable to perform a variety of functions, including, but not limited, authentication and adaptive operations, as disclosed in related U.S. patent application Ser. No. 13/828,070, titled "Adaptive Name Resolution," filed on Mar. 14, 2013, which is incorporated by reference in its entirety. The DNS resolution server can also be operable to function as a correlation point for correlating information from requests and their requestors with information that is responsible to the requests that are specific to the attributes of the requestors. By way of a non-limiting example, when a request is sent to the DNS resolution server, other information can also be sent to be used adapting or customizing the response. As discussed above, the additional information can include information related to the requestor or the requestor's device operating environment. The DNS resolution server can collect this additional information and respond to the requestor based, at least in part, on this collected information. This additional information can also be combined with a multi-factor authentication protocol that can be used to control when, where, and how information is provided to the requestor. The information collected by the DNS resolution server can also be used with additional security protocols to create logs of requestor traffic that can be used to track or determine potential security risks or anomalous behavior.

In implementations, the DNS resolution server can provide authenticating functionality using a multi-factor authentication technique, which can include 2-factor, 3-factor, or more. In this approach, the requestor is required to present two or more authentication factors such as a knowledge factor ("something that the requestor knows"), a possession factor ("something the requestor has"), and an inherence factor ("something the requestor is"). The multi-factor authentication technique can use a secure token, which can be unique a software object given to the requestor to prove the identity of the requestor, a passphrase, cookies, a one-time use password that is valid for only one use, and an encryption key. The secure token can be embodied in a physical device that the requestor retains, such as a smart phone application or a pocket-sized authentication token having a display that displays a changing passcode that must be entered into an authentication screen. The displayed passcode can be derived from a shared secret by a cryptographic process, for example, where the secret is hashed, using a cryptographic hash function, or otherwise cryptographically combined with a challenge, and the result is displayed. By using the multi-factor authentication technique, the DNS resolution server can determine to which request to respond or how to respond to a particular request based on the multiple factors. By way of a non-limiting example, the DNS resolution server may respond to a request in one manner where the request originated using a particular machine, by a particular requestor, at a particular location, and at a particular time of day. Moreover, the DNS resolution server may respond in a different manner if any or all the above factors are different and/or not valid.

In implementations, the computer-implemented method can further include storing one or more of: the at least a portion of a zone file, the one or more rules, and the information on how to access information that is not local to the DNS resolution server in a memory.

In implementations, the answer can include an internet protocol address identifying the named resource requested in the query.

In implementations, the computer-implemented method can further include applying the one or more rules to locate a record in the at least a portion of the zone file based on information in the query; and determining the answer based on the one or more rules that were applied.

In implementations, the computer-implemented method can further include obtaining another query for another named resource from another requestor, wherein the another query comprises contextual information related to the another requestor; applying one or more of: the at least a portion of the zone file, the one or more rules, and the information on how to access information that is not local to the DNS resolution server that were stored in the memory; and providing an answer to the another requestor based on the one or more of: the at least a portion of a zone file, the one or more rules, and the information on how to access information that is not local to the DNS resolution server, and the contextual information related to the another requestor that were applied.

In implementations, the computer-implemented method can further include requesting the at least the portion of a zone, the one or more rules, and the information from the authoritative name server based on the query obtained from the requestor; and receiving a challenge from the authoritative name server to authenticate the DNS resolution server based on the at least the portion of the zone, the one or more rules, and the information that was requested; and providing a response to the challenge to the authoritative name server.

In implementations, the response can include information based on a hardware profile and a software profile stored in a tamper-resistant module on the DNS resolution server.

In implementations, the context information can include device-specific information, geo-location-specific information, and/or authentication-specific information.

In implementations, the one more rules can include one or more of: provide a network identifier for a server hosting the named resource that was requested that is nearest to a geo-location of the requestor; provide a network identifier for a server hosting the named resource that meets one or more device type characteristics of the requestor, provide a network identifier for a server hosting the named resource based on an authentication level of the requestor.

In accordance with implementations consistent with the present teachings, a computer-implemented method for responding to a query request from a requestor using information supplied by an authoritative name server is disclosed. The computer-implemented method can include obtaining, by a DNS resolution server, a query for a named resource from a requestor, wherein the query comprises contextual information related to the requestor; obtaining one or more record from at least a portion of a zone file of a domain name space using the domain name system (DNS), one or more rules, and information on how to access information that is not local to the DNS resolution server from the authoritative name server based on the query obtained from the requestor; and providing, to the requestor, an answer to the query based on the at least a portion of the zone file, the one or more rules, and the contextual information.

In implementations, the computer-implemented method can include determining that the one or more records from at least the portion of the zone file is not current; and providing a request to the authoritative name server for an update to the one or more records; and providing the answer using the at least the one or more records that was updated.

It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain the principles of the application.

BRIEF DESCRIPTION OF THE DRAWINGS

FIG. 3A is an example of a script that implements rules consistent with the present teachings;

FIG. 5 illustrates an exemplary process of processing a DNS request in accordance with aspects of the present disclosure.

DETAILED DESCRIPTION

Figure 1:
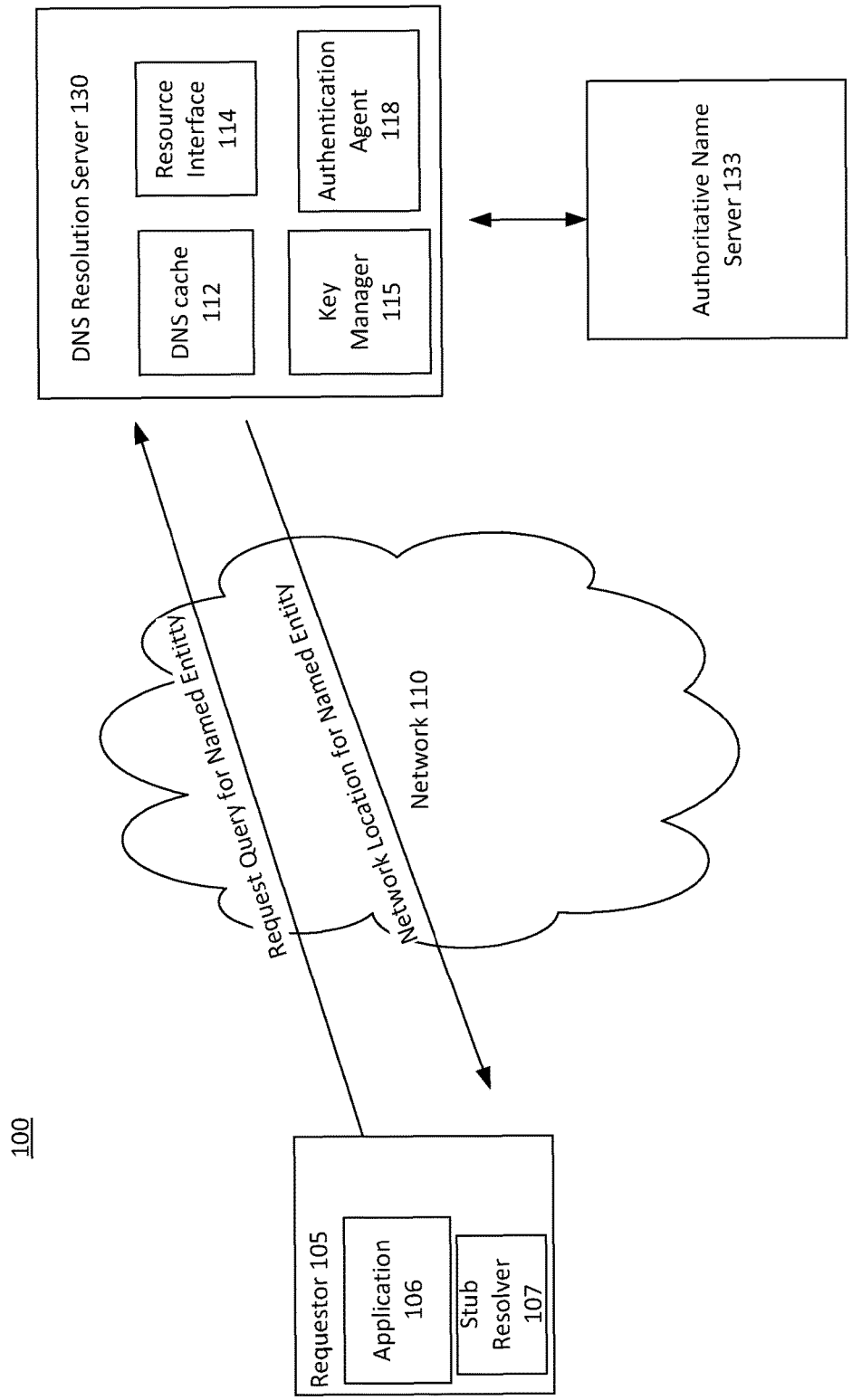
FIG. 1 illustrates an exemplary architecture demonstrating components that may be used to implement a named entity resolution platform using the enhanced cached functionality in accordance with aspects of the present disclosure.

Reference will now be made in detail to the exemplary embodiments. Wherever possible, the same reference numbers will be used throughout the drawings to refer to the same or like parts.

Traditional usage of the DNS is as a generic federated mapping database between domain names and Internet resources, and some of the transactions within the DNS architecture can be used to perform higher layer transactions, e.g., uniform resource identifier (URI) resolution, uniform resource name (URN) lookups, etc. In the traditional use of DNS, a response R to a DNS query Q about a named resource is determined by the equivalent of a table lookup. A client device sends a query Q to an authoritative name server (perhaps via an intermediate server). The name server searches a zone Z for DNS records corresponding to the query. The name server then returns a response R consisting of one or more such records, or an error message if none exists. As a simple shorthand, the name server is computing a function $R=F\_Z(Q)$ where $F\_Z$ is the "lookup" function for zone Z. In general, the lookup function can be just the process of searching through the DNS records in the zone—i.e., the zone file—for a match.

More recently, adaptive approaches to name resolution have been introduced in which the response R depends not only on the query Q, but on additional context information C. That information could include attributes of the client device that initiated the request (e.g., client-subnet), attributes of the named resource (for load balancing), security credentials, and the like. The information is processed according to certain rules that determine which of the DNS records in the zone should be returned. These rules are typically more sophisticated than used during a conventional search operation because they also take into account the context. In shorthand, the name server is now computing a function $R=F\_Z(Q,C)$, where $F\_Z$ is an "adaptive" lookup function for zone Z that also takes into account the context information according to the rules.

As an example, consider the example case where a client device wants to connect to an instance of the named resource, and there are multiple such instances, in different locations, some available at a given point of time, and some possibly not available. The adaptive lookup function selects a DNS record—for instance, a combination of domain name and IP address—based on context information that in this case could include the geographic location of the client device (or its network) and the availability of the various instances, perhaps with some randomization.

Following the example, and further described below in FIGS. 3A and 3B, the function $F\_Z$ that implements the context-specific "rules" might have the form:

If the request location is east of the Mississippi River, then randomly load balance between East Coast instances at IP addresses 192.0.2.1 and 192.0.2.2, failing to the second instance if the first is not available, and to a West Coast instance if the second is not available;

If the request location is west of the Mississippi River, then take the West Coast instance at IP address 203.0.113.1, failing to the first or second East Coast instance if the West Coast instance is not available.

Rules like these can be specified in many different ways, for example, as a script or program that determines which IP address or DNS record to return based on conditions such as those illustrated here, or as a table encoding the types and sequence of rules to be applied in resolving the query.

The implementation differences between basic and adaptive lookup functions can be significant. First, in the basic case, to enable an additional name server to process queries in a high-availability deployment, it is sufficient to send the additional name server a copy of the zone file for zone Z. In contrast, in the adaptive case, the additional name server must also be sent the rules for selecting DNS records in the zone file as a function of the context. Traditional DNS implementations are centered around zone file transfer, so the rules transfer may require special handling.

Second, in the basic case, a name server's decision can be made locally, based only on the zone file and the query. In the adaptive case, however, a name server may also access non-local information such as the attributes of a named resource (e.g., how busy it is), depending on the rules. That can require more special handling not typically associated with traditional DNS implementations.

Third, there is a difference around the caching of responses. In the basic case, an intermediate server such as a recursive name server typically caches responses that it receives from an authoritative name server for the course of their validity period, so that it can respond to other matching queries without contacting the authoritative name server again during that period. This is convenient because it reduces the load on the authoritative name server and decreases the response time to the client device. It is feasible because the function $R=F\_Z(Q)$ is deterministic (as long as the corresponding DNS records have not changed, i.e., during the stated validity period) and depends only on the query Q.

In contrast, in the adaptive case, naïve caching may not be so feasible. There are two primary reasons. First, the validity period may be effectively so short, that any cached record will likely expire before another matching query arrives. This is a consequence of the fact that response to the function may depend on non-local information that can vary significantly from one request to the next. For instance, if the response depends on how busy a given resource is, the answer could vary from moment to moment. Second, the context may also vary so much from one query to the next that each query is effectively brand new, from the perspective of the cache. For instance, if the context includes attributes of the client device, or user information such as security credentials, the query and therefore potentially the response could vary significantly. A cached value $F\_Z(Q,C)$ would only be valid for a specific context, not for other contexts for the same query Q. This problem typically occurs in the situation where the context is simply the IP address or geo-location of the requester, expressed as client-subnet where a different response must be kept for each client-subnet value, greatly expanding the size of the cache.

One way to address these limitations with caching is not to have a cache at all such that the intermediate server simply contacts the authoritative name server each time. A disadvantage to this approach, however, is that the authoritative name server must always be available. Moreover, it may not be the case that every collection of authoritative name servers will offer the same level of service. Furthermore, the additional "hop" between the intermediate server and the authoritative name server increases response time to the client device.

Various embodiments consistent with the present teachings provide systems, methods, and computer program products for configuring, authorizing, and/or authenticating an intermediate and/or a secondary name server to act or perform actions on behalf of, instead of, or in conjunction with, an authoritative name server. In the context of the present teachings, the term "intermediate" with regard to the name server will refer to the intermediate name server, once properly configured, can perform a subset of the functions that the authoritative name server is arranged to perform, and the term "secondary" with regard to the name server will refer to the secondary name server, once properly configured, can perform at least a subset up to and including all of the functions that the authoritative name server is arranged to perform.

Various embodiments consistent with the present teachings provide systems, methods, and computer program products for representing functional caching algorithms, procedures, operations, logic, or techniques (collectively referred to as rules) in look-up tables, such that an intermediate or secondary domain name server that has been properly configured and authenticated by an authoritative name server can quickly and efficiently produce the correct answer for a given query, e.g., domain name, named resource, named entity, resource record type, etc. according to functional caching requirements. In various embodiments, an answer may be an IP address ("A" resource record type) or text ("TXT" resource record type). In some embodiments, information in addition to the answer, such as a corresponding digital signature, may be stored, looked up, and returned with the answer.

Various herein described embodiments, and other embodiments consistent with the disclosure, may express the DNS caching requirements or rules for each zone as rows within a set of data tables or lookup tables, and the set of data tables may be deployed in each instance of the intermediate or secondary name server. Embodiments consistent with the disclosure provide a significant performance advantage over existing DNS caching techniques at least because they reduce the computation workload of the authoritative name server when responding to a DNS query. This is because instead of executing caching code, logic, or scripts in the authoritative name server, the intermediate or secondary name server can be configured to execute the aforementioned code, logic, or scripts, which can include looking up or searching for the relevant table rows that correspond to the query criteria specified by the DNS query.

FIG. 1 illustrates a system 100 for processing DNS queries with DNS functional caching using DNS traffic management. A requestor 105 may submit a DNS query, (which specifies a domain name, e.g., example.com, and a resource record type "A" for IP address), to an intermediate or secondary DNS name server, collectively called a DNS resolution server 130. As shown, requestor 105 can be a user that uses a client computer, which may be running a browser (not shown) to initiate the request. The requester 105 can also be the client computer, e.g., a desktop, a laptop, a tablet, or a smartphone, etc., a software agent operating on the computer at an application or operating system (OS) level (application 106), a network agent acting on behalf of the computer or the software agent, e.g., a network gateway, internet service provider (ISP), etc. The requestor 105 can use a stub resolver 107 to format the query and locate the network location for the DNS resolution server 130.

Upon receiving the DNS query, the DNS resolution server 130 attempts to look up or search for a corresponding answer (usually containing an IP address) 160 to return to the client computer of the user. If there is only one corresponding answer (not shown) or if the DNS resolution server 130 is not configured by an authoritative name server 133 to use the DNS traffic management functionality and the DNS functional caching functionality, then the DNS resolution server 130 can find and return an answer. For example, the DNS resolution server 130 can use a table lookup indexed by the domain name specified in the DNS query. If, on the other hand, there are multiple corresponding answers or if the DNS resolution server 130 is configured to by the authoritative name server 133 to use the DNS traffic management functionality and the DNS functional caching functionality, then the DNS resolution server 130 can implement this additional functionality to determine and respond with the proper answer. For example, the DNS resolution server 130 may first perform a table lookup indexed by a domain name and resource record type specified in the DNS query, and instead of finding a single answer, may find an indicator, which indicates that additional processing must be performed to find the correct answer to return from among the more-than-one possible answers associated with the domain name and resource record type.

The requestor 105 may be configured to transmit and/or receive information to the DNS resolution server 130 directly and/or indirectly via any combination of wired and/or wireless communication systems, method, and devices, including, for example, network 110. The DNS resolution server 130 comprises a localized caching system 112, which is discussed further below. For example, localized caching system 112 can be arranged to store information received by the requestor 105 and the authoritative name server 133 and can be used to determine answers to DNS queries received from one or more users. The DNS resolution server 130 can interface with a resource interface 114, which can receive credentials, such as authentication credentials, and contextual information from the requestor 105, as well as the request query for the named entity. The resource interface 114 can also interface with a key manger 115, an authentication agent 118, and the authoritative name server 133. If the requestor 105 is authenticated, then the DNS resolution server 130 can return an IP address (or network layer identifier or service location identifier) for the name resource that was requested to the requestor 105. Then the requestor 105 may access the named resource by the given IP address.

In some implementations, the DNS resolution server 130 can comprise a trusted computing agent for authenticating the DNS resolution server 130 and/or the computing environment of the DNS resolution server 130 with the authoritative name server 133. The trusted computing agent can be a part of the authentication agent 118 and can include a tamper-resistant memory that stores information related to the hardware and software configuration of the DNS resolution server. The information stored in the tamper-resistant memory is tamper-resistant to outside entities, as well as from the DNS resolution server 130. For example, the stored information can be digitally signed using a digital signature algorithm and a cryptographic key known to a trusted entity. Other conventional techniques to for tamper-resistance as in known in the art can also be used. Moreover, the stored information can provide assurance to the authoritative name server 133 that the DNS resolution server 130 can provide a trusted platform on which to run the caching functionality on behalf of the authoritative name server 133.

The DNS resolution server 130 can determine a response based on the combination of one more of the following factors: the zone file for zone Z, the query Q, the context C, and the rules that determine which of the records to return based on the query and context. The context may include both attributes of the client device and attributes of the named resource, along with other information. Among these, only the attributes of the client device are likely available to the DNS resolution server 130, since the attributes of the named resource may be non-local information that may requiring special handling. Considering these factors, the DNS resolution server 130 can have stored therein the query Q and some of the context C, but not necessarily the zone file for zone Z, nor the rules, nor other parts of the context C. A response R, which depends on context and is based on rules, only conveys the "finished product"—not the "process" by which it was achieved. Accordingly, in order for the DNS resolution server 130 to cache effectively so that it can also provide other "finished product" for other contexts, the DNS resolution server 130 may also include more of the "process": the zone file, the rules, and the context.

In some implementations, the authoritative name server 133 is configured to provide the DNS resolution server 130 with the zone file for zone Z, the rules for performing the function F_Z, and details on how to access non-local information in the context, as needed. The DNS resolution server 130 caches this information and uses it to respond to additional queries, as long as the information is valid. The DNS resolution server 130 can then perform the adaptive function F_Z on behalf of the authoritative name server 133 or for any other authoritative name server and/or zone that supports the solution. In this implementation, the DNS resolution server 130 may access the full zone, which could be continually changing. In this case, the DNS resolution server 130 may function like another instance of the authoritative name server 133 or as a secondary name server, with all its required data replication features. In some implementations, the authoritative name server 133 may only provide, and the DNS resolution server 130 to cache, the relevant records involved in processing in a given query, in response to that query, along with the rules and access to non-local information instead of the full zone file (and all its changes). A response may only depend on a subset of records, i.e., the ones associated with a given named resource. The rules determine which one of that subset to return, based on context.

In some implementations, the authoritative name server 133, in response to a query Q, provides the DNS resolution server 130 with the relevant records involved in processing Q, the relevant rules for performing the function F_Z on Q, and the relevant details on how to access non-local information in the context, as needed. The DNS resolution server 130 caches this information and uses it to respond to additional queries, as long as the information is valid. The information that is cached will tend be valid for at least as long as the information in previous implementation for the following reasons. First, the cached information can contain a subset of the total information in the zone. Second, the cached information is likely limited to a single query. In this implementation, although the context information can still change moment by moment, the cached process or function (or parts of the process or function) by which the DNS resolution server 130 handles the context information tends to stay constant for longer periods. In some implementations, both the process or function (or parts of the process or function) and the responses themselves can be cached as well by the DNS resolution server 130.

Returning to the example case previously described, the authoritative name server could provide to the DNS resolution server the various rules to be applied in resolving a query, for example as a script, program or table. The rules do not need to be provided in the same format in which they are stored at the authoritative name server. For instance, the rules could be stored in a script for convenience of implementation at the authoritative name server, but provided as a table in some standard format for interoperability, accommodating the situation that the DNS resolution server is not able to process the scripting language, but can process the table. Similarly, the rules do not need to be stored at the DNS resolution in the same format in which they are provided by the authoritative name server.

Having the rules, the DNS resolution server can now resolve a query, i.e., compute the function F_Z on Q and C, given the context C. The DNS resolution server may acquire parts of the context C from different places, depending on the nature of the parts. For instance, attributes of the client device, such as geographical location, would typically be obtained or inferred from the requester's interaction with the DNS resolution server. Attributes of the named resource, on the other hand, would typically be obtained or inferred from the named resource, which would not typically be interacting with the DNS resolution server. (In DNS, a resolution server typically provides the IP address of named resources, but does not make a connection with them.) Accordingly, attributes of the named resource, such as availability of a server instance (in the example case, one of the two East Coast servers, vs. the one West Coast server), would need to be gathered from network management information. This information is, by assumption, already accessible to the authoritative name server that would be running the rules in a conventional solution. In the invention, the information would be made accessible to the DNS resolution server as well. For example, if the authoritative name server "pings" the server instances to check their availability, the DNS resolution server could do the same. Alternatively, if the authoritative name server queries a server management system for status on server instances, the DNS resolution server could do the same. Or, the DNS resolution server and the authoritative name server could take different approaches to learn the same information.

It will generally be preferable that the DNS resolution server is able to obtain server instance availability information directly, without contacting the authoritative name server, to improve the resilience of the overall system (so that the temporary unavailability or unreachability of the authoritative name server itself does not prevent the DNS resolution server from reaching a decision). However, it is possible, as an alternative to "pinging" server instances and/or querying a server management system, that the DNS resolution server could instead get some or all of the context attributes of the named resource from the authoritative name server. This could be the primary path for obtaining the information, with the direct path being the backup in case of temporary unavailability or unreachability of the authoritative name server. This arrangement can still achieve a goal of the present disclosure in reducing dependence on the authoritative name server, assuming that the attributes of the named resource change relatively slowly, compared to the frequency of requests for resolution from client devices. In particular, if the attributes of the named resource (e.g., availability of instances) only need to be polled every 1 second, then the DNS resolution server can poll for the information primarily via the authoritative name server every 1 second in the background, and switch to the direct path, still in the background, if a reply is not received within a certain amount of time. Put another way, it is not essential that the polling be done in the foreground, during the resolution of a request from a client device. The computation of the function F_Z on Q and C can continue optimistically on the DNS resolution server in the foreground, while the parts of C related to attributes of named resources are updated in the background.

Another example of context related to the client device concerns access control. In certain applications it may be advantageous for the response to a DNS query to depend on the identity and/or access rights of the requester, as described in related U.S. patent application Ser. No. 13/828,070, titled "Adaptive Name Resolution, filed on Mar. 14, 2013 to Danny McPherson, Joseph Waldron, and Eric Osterweil, which is under common assignment with the present application. Following the model of the invention, the identity of the requester can be considered part of the context related to attributes of the requester (and thus obtained or inferred by the DNS resolution server as noted above). The access rights, typically, can be considered part of the context related to attributes of the named resource, such as an access control list indicating which identities can access the named resource, or which instances. The rules mapping query and context to response would then select a DNS record based on identity and access rights. Those rules—perhaps including an access control list—could then be provided to the DNS resolution server by the authoritative name server. For higher assurance, the client device (or user's) identity may be authenticated by the DNS resolution server or by a separate server; this would be an example where security credentials (for instance, an authentication assertion) are part of the context.

One skilled in the art will appreciate that the architecture of FIG. 1 is merely exemplary. Other networking devices may be incorporated to manage traffic. In particular, one skilled in the art would recognize that firewalls, load balancers, additional mirrored servers (name server, resource server, interfaces), and certain name server caches may be incorporated into the network design and architecture. Further, one skilled in the art will recognize that additional hierarchical DNS servers may be queried, and that interfaces and servers may be combined to be on one physical machine. For example, the resource interface 114 can be physically and programmatically collocated on the same machine or machines as the DNS resolution server 130.

Further, although a DNS server on the Internet traditionally operates as returning an IP address, this function can be localized at higher IP layers for dedicated networks. For example a DNS server that returns a network layer identifier and a service location identifier may essentially be returning an IP address corresponding to a machine. However, a DNS server may also be understood to return a network layer identifier and service location identifier in the terms of a Uniform Resource Identifier (URI), identifying a particular layer and service location. One of ordinary skill in the art will appreciate that any mention of returning an IP address alone in this disclosure should be understood to alternatively and additionally include the possibility of distinguishing between a network layer identifier or a service location identifier.

The DNS resolution server 130 can interface with a security policy engine (not shown), either external or internal to the network 110. The security policy engine may inform security functions at the DNS resolution server 130 or any other networking device that is designed to make use of security policies.

The DNS resolution server 130 and/or the authoritative name server 133 can be implemented in software as software modules or programs on one or more computing systems. For example, the functionality of the DNS resolution server 130 and/or the authoritative name server 133 can comprise one or more applications, which may comprise one or more computer units of computer-readable instructions which, when executed by a processor, cause one or more computers to perform steps of a method. In particular, the exemplary architecture in FIG. 1 can support execution of program code on one or more computers to accomplish the overall method. Computer-readable instructions may be stored on a computer-readable medium, such as a memory or disk. Such media typically provide non-transitory storage. One or more of the components depicted in FIG. 1 can be hardware components or combinations of hardware and software such as, for example, special purpose computers or general purpose computers. A computer or computer system may also comprise an internal or external database. The database can comprise one or more individual databases or databases configured to act together. The database can be implemented in a commercial, open source, or proprietary database program or can be contained in log files, flat files, or any other data storage mechanism. The components of a computer or computer system can, among other things, connect through a local bus interface or over a local or wide area network. The components depicted in FIG. 1 can be operatively connected to one another via a network, not shown, such as the Internet, an intranet, or any type of wired or wireless communication system. Connections may be implemented through a direct communication link, a local area network (LAN), a wide area network (WAN) and/or other suitable connections.

In implementations, the DNS resolution server 130 can be operable to perform a variety of functions, including, but not limited to, authentication and adaptive operations. For example, the DNS resolution server 130 can also be operable to receive, process, and/or store the information contained with the request query from the requestor 105. The information can also include multi-factor authentication that can be used by the DNS resolution server 130 to control when, where, and how the named entity that was requested by the requestor 105 is provided to the requestor 105. The information collected by the DNS resolution server 130 can also be used with additional security protocols to create logs of user traffic that can be used to track or determine potential security ricks or anomalous behavior.

In the embodiment of FIG. 1, the requestor 105 may communicate directly with the DNS resolution server 130 via network 110 using standard Internet Protocols, such as HTTP, transmission control protocol (TCP), internet protocol (IP), etc. For example, HTTP requests from the requestor 105 may be encapsulated in TCP segments, IP datagrams, and Ethernet frames and transmitted to the name server 115. In some embodiments, third parties may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications from the requestor 105 to the DNS resolution server 130.

Figure 2:
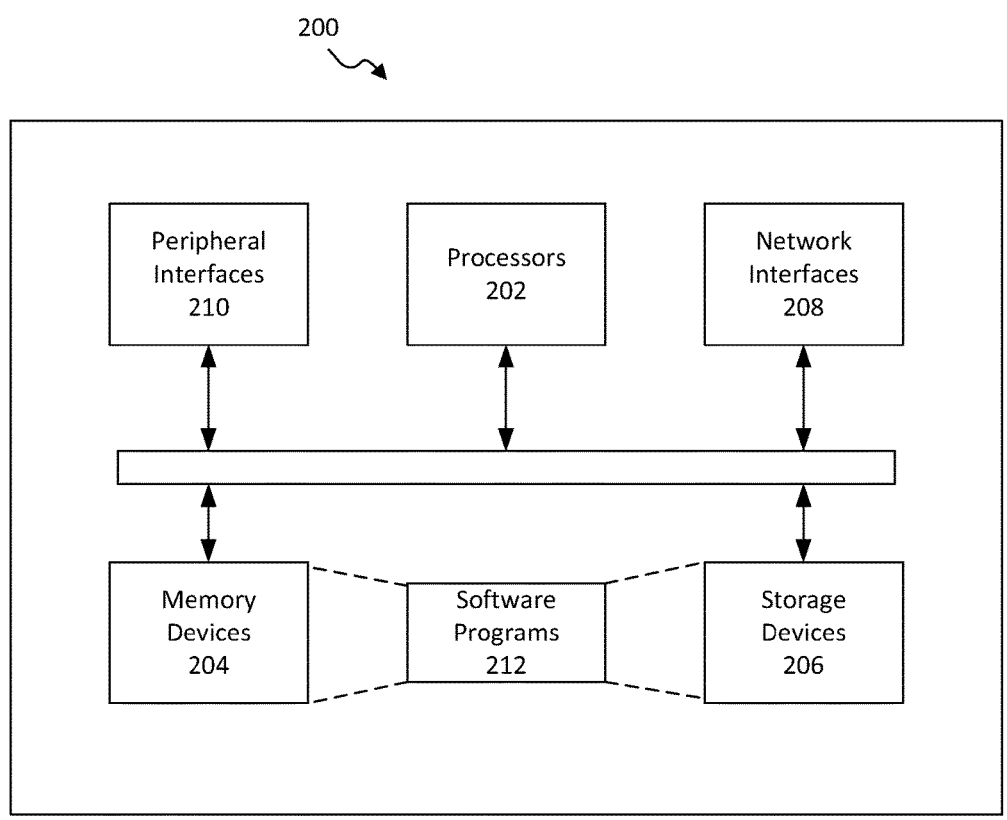
FIG. 2 illustrates an exemplary architecture demonstrating components that may be used to implement a requestor in accordance with aspects of the present disclosure.

FIG. 2 is a diagram depicting an exemplary hardware configuration for a computing device 200, such as may be used to implement requestor 105 or DNS resolution 130, and that may be used to perform one or more of the processes as described herein. While FIG. 2 illustrates various components contained in computing device 200, one skilled in the art will realize that FIG. 2 is one example of a computing device and that additional components can be added and existing components can be removed.

As illustrated in FIG. 2, computing device 200 can include one or more processors 202 of varying core configurations and clock frequencies. Computing device 800 can also include one or more memory devices 204 that serve as a main memory during the operation of computing device 200. Computing device 200 can also include one or more peripheral interfaces 206, such as keyboards, mice, touchpads, computer screens, touchscreens, etc., for enabling human interaction with and manipulation of computing device 200.

Computing device 200 can also include one or more network interfaces 208 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. Computing device 200 can also include one or more storage device 210 of varying physical dimensions and storage capacities, such as flash drives, hard drives, random access memory, etc., for storing data, such as images, files, and program instructions for execution by the one or more processors 202. One or more software programs 212 can be stored in the one or more memory devices 204 and/or on in the one or more storage devices 210. For example, the one or more software program can include an operating system, and any other software program utilized by computing device 200.

The computing device 200 can comprise one or more processor(s), which may comprise a microprocessor, microcontroller, digital signal processor, co-processor or other similar devices known to those having ordinary skill in the art. The applications described herein may be implemented as either software, firmware and/or hardware applications and may be implemented as a set of computer or machine-readable instructions stored in any type of non-transitory computer-readable or machine-readable storage medium or other storage device. Some non-limiting examples of non-transitory computer-readable mediums may be embodied using any currently known media such as magnetic or optical storage media including removable media such as floppy disks, compact discs, DVDs, BLU-RAY, flash memory, hard disk drives, etc. In addition, the storage device(s) as discussed herein may comprise a combination of non-transitory, volatile or nonvolatile memory such as random access memory (RAM) or read only memory (ROM). One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

In embodiments, the components of computing device 200 need not be enclosed within a single enclosure or even located in close proximity to one another. Those skilled in the art will appreciate that the above-described componentry are examples only, as computing device 200 can include any type of hardware componentry, including any necessary accompanying firmware or software, for performing the disclosed embodiments. Computing device 200 can also be implemented in part or in whole by electronic circuit components or processors, such as application-specific integrated circuits (ASICs) or field-programmable gate arrays (FPGAs).

One skilled in the art will appreciate that additional networking devices may be used in conjunction with the embodiments described herein. For example, the architecture may also use a load balancer to distribute demand to a multitude of resource servers. In this case, an IP address may be provisioned on the load balancer along with a policy directing which resource server to forward traffic to. The IP address may also be provisioned on the identified resource server. Other variants of common networking architecture schemes incorporating the embodiments described herein would be apparent to one of ordinary skill.

FIG. 3A is an example of a script 300 that implements rules, e.g., traffic management rules, by the DNS resolution server 130 employing the functional caching functionality in accordance with the present disclosure. FIG. 3A follows the above example where the domain name "example.com" has three servers associated with it—two servers located on the East coast of the U.S. (East coast server number 1 having IP address 192.0.2.1, and East coast server number 2 having IP address 192.0.2.2) and one server located on the West coast (West coast server having IP address 203.0.113.1). Further consider that the registrant of "example.com" desires to manage the traffic to their website, (which is hosted by all three servers), such that:

1) users located East of the Mississippi river are directed to one of the East coast servers (see the code at the label "Start:");
2) the East coast servers are load balanced such that East coast server number 1 receives 80 percent of the Eastern traffic and East coast server number 2 receives the remaining 20 percent (see the code at the label "Load Balance:");
3) users located West of the Mississippi river are directed to the West coast server (see the code at the ELSE at the label "Start:");
4) if any of the three servers are down, the traffic that would otherwise go to it is directed to another server that is up (see the code at the labels "Fail_Over_1:" "Fail_Over_2:" and "Fail_Over_212:"); and
5) if all of the three servers are down, the traffic will be directed to East coast server number 2.

Figure 3B:
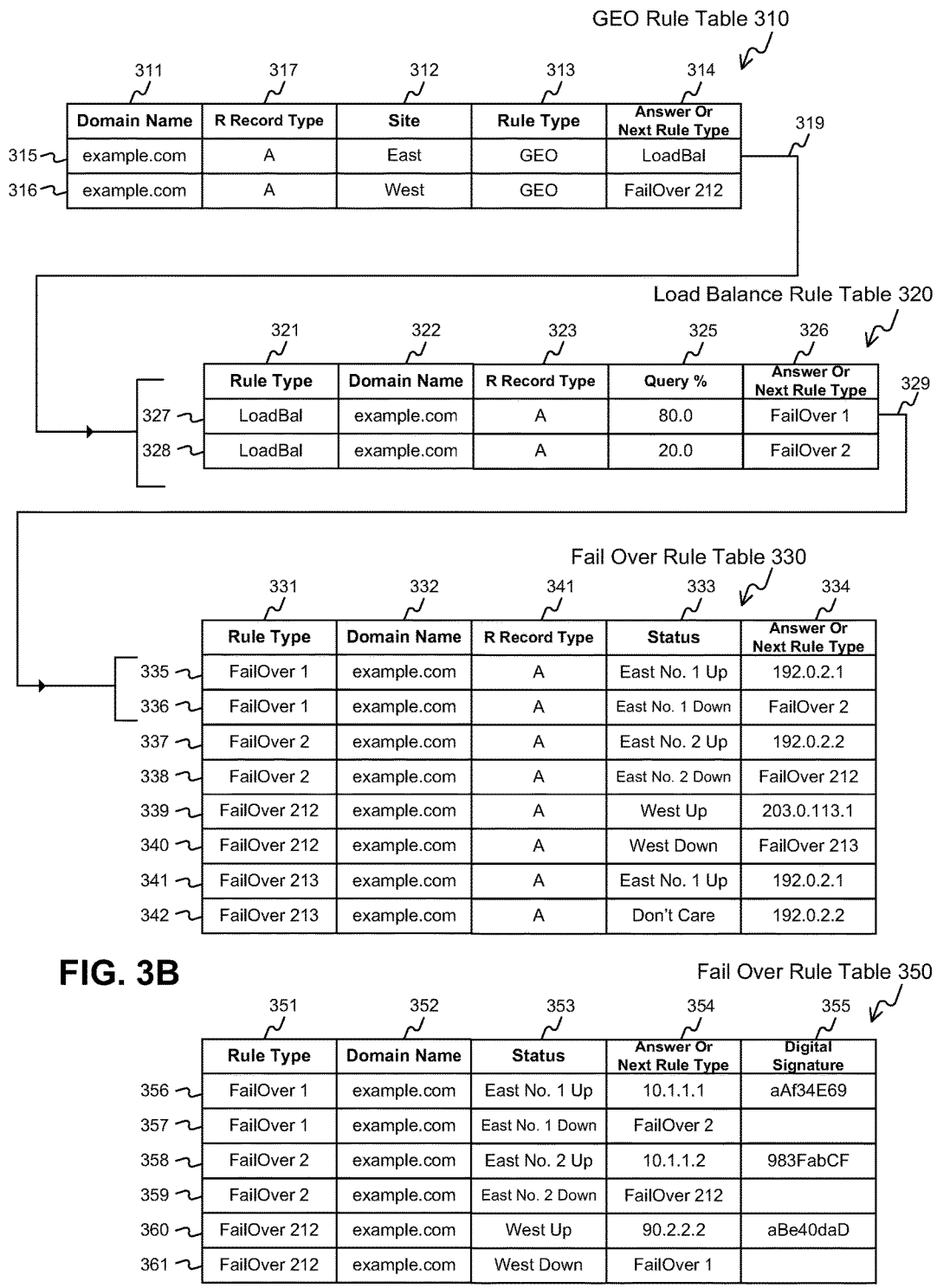
FIG. 3B is an example of a set of tables consistent with the present teachings.

FIG. 3B is an example of a set of traffic management tables that are related to the script of FIG. 3A that provides four examples of traffic management tables for the domain name "example.com": a GEO rule table 310, a load balance rule table 320, and two examples of fail over rule tables 330 and 340, where fail over rule table 340 is the same as fail over rule table 330, but with an additional column 355 that provides additional information (digital signature information in this example) along with the final IP address.

The rules tables of FIG. 3B represent the traffic management script 300 of FIG. 3A as lookup tables. For example, in the embodiment shown in FIG. 3B, the GEO rule table 310 corresponds to the section of script code labeled "START" in FIG. 3A.

In a usage example with reference to FIGS. 1 and 3B, upon receiving a DNS query specifying "example.com" as the domain name and "A" as the resource record type, the DNS resolution server 130 may perform an initial table lookup or search of domain name "example.com" and resource record type "A" and discover the traffic management indicator, which indicates that additional traffic-management-rule lookup(s) or search(es) are required (as opposed to discovering an answer as would be the case for a domain name having a single answer (e.g., a single IP address) and/or no traffic management functionality).

Triggered by the traffic management indicator, the DNS resolution server 130 next finds a table indexed by the domain name "example.com" and resource record type "A" in the first and the second columns—in the example shown in FIG. 3B, the DNS resolution server 130 finds the GEO rule table 310, which contains "example.com" in both rows 315 and 316 of the first column 311, resource record type "A" in the second column 317, and the rule type "GEO" in the rule type column 313. Triggered by the rule type of "GEO" in column 313, the DNS resolution server 130 then determines whether the requestor 105 is located in the East (column 312, row 315) or the West (column 312, row 316). In various embodiments, the DNS resolution server 130 may make this determination by extracting the IP address of the requestor 10 from the DNS query and matching that IP address with its geographic location via a geographic lookup table, via a web service that returns a geographic location when given an IP address, or via some other means as are commonly known in the art.

If the requestor 105 is located in the East, then the DNS resolution server 130 matches with or looks up row 315 (because column 312, row 315 contains "East") to try to find an answer in row 315 of the Answer Or Next Rule Type column 314. If, on the other hand, the requestor 105 is located in the West, then the DNS resolution server 130 matches with or looks up row 316 (because column 312, row 316 contains "West") to try to find an answer in row 316 of the Answer Or Next Rule Type column 314.

In this example, which represents the script 300 shown in FIG. 3A, neither row 315 nor row 316 of column 314 contains an answer because there are other traffic management rules to resolve in additional to GEO. Here, if the requestor 105 is located in the East, then a load balancing rule must be carried out, as corresponds to section of script code labeled "LOAD_BALANCE" in FIG. 3A. Or, if the requestor 105 is located in the West, then a fail over rule must be carried out, as corresponds to section of script code labeled "FAIL_OVER_212" in FIG. 3A.

Assuming for this example that the requestor 105 is located in the East, the DNS resolution server 130 next looks up or searches for a rules table row that matches rule type="LoadBal" (from column 314, row 315 of the GEO rule table 310) and that matches domain name="example.com" and resource record type="A" (from the DNS query), which leads to the load balance rules table 320, based on columns 321, 322, and 323, respectively. This is represented by an arrow 319 in FIG. 3B.

Triggered by the rule type of "LoadBal" in column 321, the DNS resolution server 130 then generates a random number from 1-100 to apply against the "Query %" (column 325). If the number is from 1-80, then it matches the 80% row (column 325, row 327) and if it is from 81-100 then it matches the 20% row (column 325, row 328).

If load balance table row 327 is matched or looked up, then the DNS resolution server 130 tries to find an answer in the Answer Or Next Rule Type column 326 of row 327. If, on the other hand, load balance table row 328 is matched or looked up, then the DNS resolution server 130 tries to find an answer in the Answer Or Next Rule Type column 326 of row 328.

In this example, which represents the script 300 shown in FIG. 3A, neither row 327 nor row 328 of column 326 contains an answer because there are other traffic management rules to resolve in addition to the load balancing. Here, if the query randomly is placed into the 80% category, then a fail over rule for East server 1 must be carried out, as corresponds to the section of script code labeled "FAIL_OVER_1" in FIG. 3A. Or, if the query randomly is placed into the other 20% category, then a fail over rule for East server 2 must be carried out, as corresponds to section of script code labeled "FAIL_OVER_2" in FIG. 3A.

Assuming for this example that the random number was less than 80, causing a search match with row 327 of the load balance rules table 320, the DNS resolution server 130 next searches for a rules table row that matches rules type="FailOver 1" (from column 326, row 327 of the load balance rule table 320) and that matches domain name="example.com" and resource record type="A" (from the DNS query), which leads to the fail over rule table 330, based on matching columns 331, 332, and, 341, respectively. This is represented by an arrow 329 in FIG. 3B.

Triggered by the rules type of "FailOver 1" in column 331, rows 335 and 336, the DNS resolution server 130 then ascertains the status of the East No. 1 server. If the East No. 1 server is "Up," then the lookup matches the "East No. 1 Up" row (column 333, row 335) or if the East No. 1 server is "Down," then the lookup matches the "East No. 1 Down" row (column 333, row 336).

Assuming for this example that the East No. 1 server is "Up," causing a look up match or search match with row 335 of the fail over rules table 320, then the DNS resolution server 130 considers the Answer or Next Rule Type column 334 to find out what to do next. In this case, matching row 335 of column 334 contains an answer of "192.0.2.1," which is the IP address of the East coast server No. 1, and because this is indeed an IP address and not another rule indicator or pointer, the DNS resolution server 130 returns the IP address "192.0.2.1" as the answer to the DNS query.

As with the example just presented that ends up returning the IP address "192.0.2.1" as the answer to the DNS query, the DNS resolution 130 may similarly navigate other paths through tables 310, 320, and 330 to arrive at either of the other two possible IP addresses ("192.0.2.2" at column 334, rows 337, 342, or "203.0.113.1" at column 334, row 339) in accordance with the variables and the traffic management rules and criteria shown in FIG. 3A.

As noted above, these examples are simplified to very clearly illustrate various embodiments consistent with the present teachings. In working implementations and embodiments in the DNS context, the traffic management tables, and the information returned by the DNS resolution server 130 in response to the DNS query, is fully DNS compliant. For example, instead of an IP address as shown in the example of FIG. 3B, the IP Address or Next Rule Type column 334 may contain a DNS resource record corresponding to the IP address (e.g., an A resource record for an AAAA resource record) or a pointer thereto, such that the DNS resolution server 130 returns the resource record per standard DNS requirements and procedures.

In some embodiments, additional tables, or a table that includes additional information, may be used to return additional, non-IP-address information in response to the DNS query, such as DNSSEC information that goes along with an IP address. In one such embodiment, a table such as fail over rule table 350 may be used in place of fail over rule table 330. As shown, the fail over rule table 350 includes in column 355 the DNSSEC digital signature that corresponds to each answer in column 354, and the DNS resolution server 130 may look up and return to the requestor the additional information in column 355 along with the answer in column 354. Note that for conciseness and clarity, the "R record Type" column and the "FailOver 213" rows of the fail over rule table 350 have been left off FIG. 3B.

One of ordinary skill will recognize that the components and implementation details of the lookup tables in FIG. 3B are simplified examples presented for conciseness and clarity of explanation. Other components, implementation details, and variations may be used. For example, the answer of columns 334 or 354 may be contained in a separate table instead of being tied to the fail over rules tables 330 and 350, which may make generation, modification, and rearrangement of the rules tables 310, 320, 330, and 340 easier as the traffic management requirements of a given domain name and domain name owner change.

Figure 4:
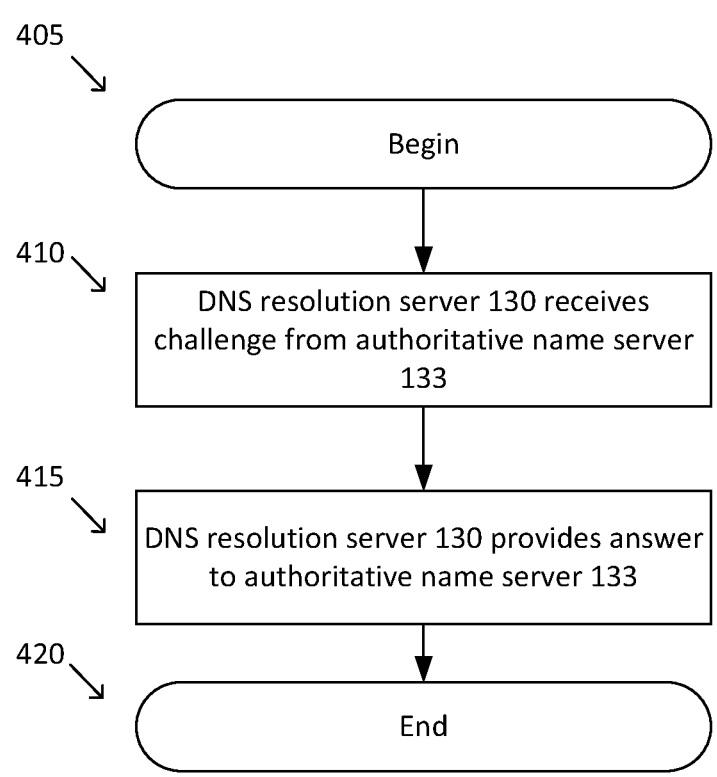
FIG. 4 illustrates an exemplary process of configuring and authenticating a DNS server with an authoritative name server in accordance with aspects of the present disclosure.

FIG. 4 shows an example computer-implemented method for configuring the DNS resolution server 130 by the authoritative name server 133. The method can begin at 405. At 410, the DNS resolution server 130 can receive an authentication challenge from the authoritative name server 133. The authentication challenge can be provided prior to, in response to, or subsequent to a DNS request by the DNS resolution server 130 to the authoritative name server 133. The authentication challenge can be provided in numerous formats, including, but not limited to using DNS security (DNSSEC). At 415, the DNS resolution server 130 can provide an answer to the authentication challenge. For example, the authoritative server 133 can provide information that the DNS resolution server 130 can use to provide the functional caching. If the DNS resolution server 130 is enabled to process and use the functional caching information, the authoritative name server 133 can use this as confirmation that the DNS resolution server 130 is properly configured. In implementations, authentication challenge can authenticate not only the operation of the DNS resolution server 130, but also the operating platform on which the DNS resolution server 130 is running using, for example, a trusted computing platform. In this example, a trusted computing module can be included with the DNS resolution server 130 which stores information that is tamper-resistant, as discussed above, by another entity including the DNS resolution server 130. The information stored can be set at the time that the DNS resolution server 130 was initially configured and can include a hardware and/or software configuration of the DNS resolution server 130. In response to the authentication challenge from the authoritative server 133, the DNS resolution server 130 can provide a command to the trusted computing platform to answer the challenge using information stored therein. At 420, the process can end or return to any previous steps above.

FIG. 5 shows an example computer-implemented method for responding to a query request from the requestor 105 using information supplied by the authoritative name server 133. At 505 the method begins, and at 510, the DNS resolution server 130 obtains a query for a named resource from the requestor 105. The requestor 105 can include, but is not limited to, a client computer, e.g., a smart phone, a laptop, a tablet computer, a user of the client computer, or an agent acting on behalf of either the client computer or the user, e.g., an Internet Service Provider (ISP). The query can comprise contextual information related to the requestor, including, but not limited to, information related to the type of requestor, e.g., device type and configuration, information related to how the requestor would like information to be delivered, e.g., an IP address of a mobile web page hosting the named resource being requested, information related to a geographic location of the requestor that can be used to direct the requestor 105 to a geographically near server that hosts the named resource being requested. Other type of information, including authentication information, can also be included in the query.

At 515, the DNS resolution server 130 can obtain information from the authoritative name server 133 based on or subsequent to the query from the requestor 105. In some implementations, the information can include at least a portion of a zone file of a domain name space using the DNS, one or more rules, and information on how to access information that is not local to the DNS resolution server from the authoritative name server 133. In some implementations, the information can include one or more records from at least a portion of a zone file of a domain name space, one or more rules, and information on how to access information that is not local to the DNS resolution server 130. The information provided to the DNS resolution server 130 from the authoritative server 133 can be conveyed using a scripting language, for example, but is not limited to a Lua scripting protocol. Other scripting protocols may also be used.

In implementations, once obtained, the DNS resolution server 130 can store the information that was received from the authoritative name server 133 in memory that can be used to answer other queries for the same or another requestor. The DNS resolution server 130 can periodically check to determine if the information that was received from the authoritative name server 133 is current. For example, the information can be included with a timestamp or other temporal indictor to indicate the duration that the information is current. Periodically, the DNS resolution server 130 can request or subscribe to update from the authoritative name server 133. Alternatively, the authoritative name server 133 can push updates the DNS resolution server 130.

At 520, the DNS resolution server 130 can provide an answer, e.g., an IP address, to the requestor 105 for the query based on the at least a portion of the zone file, the one or more rules, and the contextual information. For example, the DNS resolution server 130 can apply the one or more rules to locate a record in the at least the portion of the zone file based on information in the query. Based on the record located, the answer to the query can found and provided to the requestor 105. For example, if the query contains information identifying a particular device type/configuration located at a particular geographic location, the DNS resolution server 130 can apply the one or more rules to locate a record formatted for that particular device type/configuration and located near a location to the requestor 105.

In implementations, the DNS resolution server 130 can provide an answer to another query from the same requestor or another requestor using the information stored from the authoritative name server 133. For example, if the second query contains information similar to the type in the initial request, but from a different geographic location, the DNS resolution server 130 can apply the one or more rules to locate a record formatted for that particular device type/configuration and located near a location to the second requestor. At 525, the method can end or return to any previous steps above.

The present disclosure is not to be limited in terms of the particular embodiments described in this application, which are intended as illustrations of various aspects. Many modifications and variations can be made without departing from its spirit and scope, as will be apparent. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Other embodiments of the disclosure will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A computer-implemented method for responding to a domain name system ("DNS") query request from a requestor using information supplied by an authoritative name server, the computer-implemented method comprising:

obtaining, by a DNS resolution server over a network, a DNS query for a named resource from a requestor, wherein the DNS query comprises information comprising a requestor-based contextual information related to the requestor, wherein the requestor-based contextual information comprises geo-location data of the requestor;

providing, by the DNS resolution server, authentication information to the authoritative name server to authenticate the DNS resolution server;

obtaining at least a portion of a zone file of a domain name space using the DNS query and information on how to access information about the named resource that is not local to the DNS resolution server from the authoritative name server based on the DNS query obtained from the requestor for the DNS resolution server that is authenticated by the authoritative name server, wherein the information about the named resource that is not local comprises a plurality of attributes associated with the named resource, the plurality of attributes comprising an availability indicator that indicates an availability of a server instance on which the named recourse is hosted and a security indicator that indicates a security level related to a potential requestor that may request access to the named resource;

applying one or more rules to the portion of the zone file, the requestor-based contextual information, a named resource-based contextual information, and the information about the named resource that is not local to the DNS resolution server;

determining, by a hardware processor of the DNS resolution server, an answer to the DNS query based on the one or more rules that are applied; and providing, to the requestor, the answer to the DNS query, wherein the answer is a DNS record associated with the named resource.

2. The computer-implemented method according to claim 1, further comprising caching the one or more rules, and the information on how to access information that is not local to the DNS resolution server from the authoritative name server based on the DNS query obtained from the requestor.

3. The computer-implemented method according to claim 1, further comprising:

determining that the at least the portion of the zone file is not current; and providing a request to the authoritative name server for an update to the at least the portion of the zone file; and providing the answer using the at least the portion of the zone file that was updated.

4. The computer-implemented method according to claim 1, wherein the requestor is one or more of: a client computer, a user associated with the client computer, and an agent acting on behalf of the client computer or the user.

5. The computer-implemented method according to claim 1, wherein the requestor-based contextual information is related to one or more of: the requestor and an identifier included in the DNS query.

6. The computer-implemented method according to claim 1, further comprising storing one or more of: the at least a portion of the zone file, the one or more rules, and the information on how to access information about the named resource that is not local to the DNS resolution server in a memory.

7. The computer-implemented method according to claim 6, further comprising:
    obtaining another DNS query for another named resource from another requestor, wherein the another query comprises contextual information related to the another requestor;
    applying one or more of: the at least the portion of the zone file, the one or more rules, and the information on how to access information about the another named resource that is not local to the DNS resolution server that were stored in the memory; and
    providing an answer to the another requestor based on the one or more of: the at least a portion of the zone file, the one or more rules, and the information on how to access information about the another named resource that is not local to the DNS resolution server, and the contextual information related to the another requestor that were applied.

8. The computer-implemented method according to claim 1, further comprising:
    requesting the at least the portion of a zone, the one or more rules, and the information about the another named resource from the authoritative name server based on the DNS query obtained from the requestor; and
    receiving a challenge from the authoritative name server to authenticate the DNS resolution server based on the at least the portion of the zone, the one or more rules, and the information that was requested; and
    providing a response to the challenge to the authoritative name server.

9. The computer-implemented method according to claim 1, wherein the answer comprises an internet protocol address identifying the named resource requested in the DNS query.

10. The computer-implemented method according to claim 1, further comprising:
    applying the one or more rules to locate a record in the at least a portion of the zone file based on information in the DNS query; and
    determining the answer based on the one or more rules that were applied.

11. The computer-implemented method according to claim 8, wherein the response comprises information based on a hardware profile and a software profile stored in a tamper-resistant module on the DNS resolution server.

12. The computer-implemented method according to claim 1, wherein the contextual information comprises one or more of: device-specific information; geo-location-specific information; authentication-specific information.

13. The computer-implemented method according to claim 1, wherein the one more rules comprise one or more of: provide a network identifier for a server hosting the named resource that was requested that is nearest to a geo-location of the requestor; provide a network identifier for a server hosting the named resource that meets one or more device type characteristics of the requestor, provide a network identifier for a server hosting the named resource based on an authentication level of the requestor.

14. A computer-implemented method for responding to a domain name system ("DNS") query request from a requestor using information supplied by an authoritative name server, the computer-implemented method comprising:
    obtaining, by a DNS resolution server over a network, a DNS query for a named resource from a requestor, wherein the DNS query comprises requestor-based contextual information related to the requestor, wherein the requestor-based contextual information comprises geo-location data of the requestor;
    providing, by the DNS resolution server, authentication information to the authoritative name server to authenticate the DNS resolution server;
    obtaining one or more records from at least a portion of a zone file of a domain name space using the DNS query and information on how to access information about the named resource that is not local to the DNS resolution server from the authoritative name server based on the DNS query obtained from the requestor for the DNS resolution server that is authenticated by the authoritative name server, wherein the information about the named resource that is not local comprises a plurality of attributes associated with the named resource, the plurality of attributes comprising an availability indicator that indicates an availability of a server instance on which the named recourse is hosted and a security indicator that indicates a security level related to a potential requestor that may request access to the named resource;
    applying one or more rules to the one or more records, the requestor-based contextual information, a named resource-based contextual information, and the information about the named resource that is not local to the DNS resolution server;
    determining, by a hardware processor of the DNS resolution server, an answer to the DNS query based on the one or more rules that are applied; and
    providing, to the requestor, the answer to the DNS query, wherein the answer is a DNS record associated with the named resource.

15. The computer-implemented method according to claim 14, further comprising:
    determining that the one or more records from at least the portion of the zone file is not current; and
    providing a request to the authoritative name server for an update to the one or more records; and
    providing the answer using the at least the one or more records that was updated.

16. The computer-implemented method according to claim 14, wherein the requestor is one or more of: a client computer, a user associated with the client computer, and an agent acting on behalf of the client computer or the user.

17. The computer-implemented method according to claim 15, wherein the requestor-based contextual information is related to one or more of: the requestor and an identifier included in the DNS query.

18. The computer-implemented method according to claim 14, further comprising storing one or more of: the one or more records, the one or more rules, and the information on how to access information that is not local to the DNS resolution server in a memory.

19. The computer-implemented method according to claim 14, wherein the answer comprises an internet protocol address used to locate the named resource requested in the query.

20. The computer-implemented method according to claim 14, further comprising:
    obtaining another DNS query for another named resource from another requestor, wherein the another query comprises contextual information related to the another requestor;
    applying one or more of: the one or more records, the one or more rules, and the information on how to access information that is not local to the DNS resolution server that were stored in the memory; and
    providing an answer to the another requestor based on the one or more of: the one or more records, the one or more rules, and the information on how to access information that is not local to the DNS resolution server, and the contextual information related to the another requestor that were applied.

21. The computer-implemented method according to claim 14, further comprising:
    requesting the one or more records, the one or more rules, and the information from the authoritative name server based on the DNS query obtained from the requestor; and
    receiving a challenge from the authoritative name server to authenticate the DNS resolution server based on the at least the portion of the zone, the one or more rules, and the information that was requested; and
    providing a response to the challenge to the authoritative name server.

22. The computer-implemented method according to claim 21, wherein the response comprises information based on a hardware profile and a software profile stored in a tamper-resistant module on the DNS resolution server.

\* \* \* \* \*